3,006,925
3-PYRROLIDYL ETHANOLS
Rolland Frederick Feldkamp, William Milner Coates, and John Raymond Corrigan, Evansville, Ind., assignors to Mead Johnson & Company, Evansville, Ind., a corporation of Indiana
No Drawing. Filed Mar. 13, 1959, Ser. No. 799,072
8 Claims. (Cl. 260—326.5)

This invention relates to compositions having valuable therapeutic and pharmacological properties and more specifically to 1-phenyl-1-substituted-2-(1-lower alkyl-3-pyrrolidyl)ethanols and to processes for preparing the same.

One of the objects of this invention is the provision of pyrrolidyl ethanols having the following structural formula:

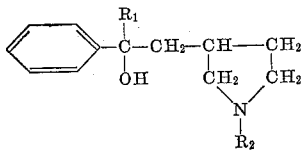

wherein $R_1$ is a radical preferably selected from the group consisting of phenyl, tolyl and cyclohexyl, and $R_2$ is a lower alkyl hydrocarbon preferably containing up to 6 carbon atoms, such as, for example, methyl, ethyl and isopropyl. The nontoxic pharmacologically acceptable acid addition salts of these compounds are also contemplated as part of this invention.

The compounds of the present invention are useful as pharmaceutical agents and have unusual and unexpected utility in the relief of muscular tremors and convulsive disorders in animals. The dosage for mammals is from about 8 to about 12 milligrams per kilogram of body weight per day, administered in appropriate portions from one to four times daily. These compounds may be administered orally in the form of tablets, wafers, elixirs, liquid suspension powders, capsules, or the like, or intravenously in solution.

The above compounds are prepared by a Grignard synthesis involving the reaction of a 1-substituted-3-pyrrolidylmethyl magnesium halide on a ketone. While the preparation of the aforementioned Grignard reagents is theoretically possible, it has been found that the preparations are very dependent upon the reaction conditions employed. Under certain conditions, the 1-lower alkyl-3-pyrrolidylmethyl halides can be caused to readily react with metallic magnesium in ethereal solvents to form solutions of the desired reactive Grignard reagents. The pyrrolidyl methyl halide starting material and its preparation are disclosed in Feldkamp and Wu United States Patent No. 2,826,588, issued March 11, 1958. Generally halides such as the chloride, bromide and iodide may be used in the preparation of the metallo-organic Grignard intermediate.

The preparation of the aforesaid Grignard reagent may be carried out as indicated in an anhydrous ethereal solvent including lower alkyl ethers, such as diethyl ether, and cyclic ethers, such as tetrahydrofuran, the latter of which is the preferred solvent for preparing these compounds. The reaction between the Grignard reagent is preferably carried out under substantially anhydrous conditions. If desired, an initiator or catalyst, such as iodine, methyl iodide, ethyl bromide, or the like, may be utilized in this step of the process. The ketone utilized as a starting material in the preparation of the products of the present invention may be selected from the group consisting of diphenyl, phenylcyclohexyl, and phenyltolyl ketones of which the most preferred is benzophenone.

The foregoing process may be illustrated by means of the following equations, wherein $R_1$ and $R_2$ have the meaning as described above and wherein X is halogen:

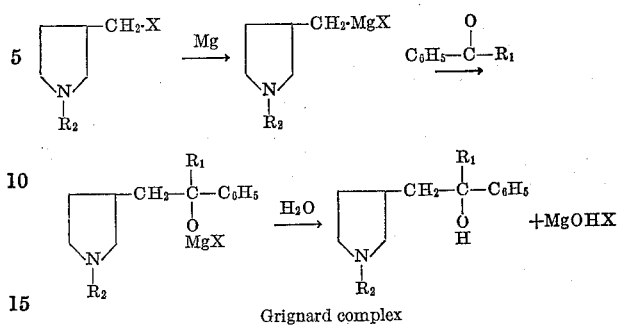

Grignard complex

In the process of the present invention the complex intermediate as shown in the above equation may be prepared by simple heating of the Grignard and the ketone reactants under relatively mild conditions as is well known in carrying out Grignard reactions. Refluxing temperatures are conveniently employed. The hydrolysis step or decomposition of the complex is readily carried out by the addition of water. The pyrrolidyl ethanol product thus formed may be recovered from the decomposition mixture by extraction with a suitable solvent. The solvent may then be removed by evaporation at normal or, if desired, reduced atmospheric pressure. The acid addition salts of the compounds of this invention may be prepared by conventional techniques. For example treatment of an ether solution of the free base with hydrogen chloride is a suitable method for preparing the hydrochloride salt. Other suitable acid addition salts of these compounds are hydrobromides, hydroiodides, sulfates, phosphates, acetates, citrates, succinates, tartrates, and the like.

The following examples will illustrate the preparation of specific compounds and their acid addition salts by the above described method:

*Example I*

*1-methyl-3-pyrrolidylmethylmagnesium chloride.*—To 2.43 grams (0.1 mole) of magnesium turnings and 5 milliliters of tetrahydrofuran was added 1.1 gram (0.01 mole) of ethyl bromide. When the reaction was well started, a solution of 13.36 grams (0.1 mole) of 1-methyl-3-pyrrolidylmethyl chloride in 45 milliliters of tetrahydrofuran was added dropwise with stirring at a rate which maintained gentle reflux. When the addition was complete, the dark solution was stirred at reflux for one hour and cooled to 20–25° C. prior to use as an intermediate.

*1,1 - diphenyl-2-(1-methyl-3-pyrrolidyl)ethanol hydrochloride.*—To 1 - methyl - 3 - pyrrolidylmethylmagnesium chloride (approximately 0.1 mole) with stirring and cooling, was added 9.11 grams (0.05 mole) of benzophenone in portions at 30–35° C. When addition of the ketone was complete, the mixture was stirred at room temperature for two and one-half hours and the bulk of the solvent removed at reduced pressure with warming at 60–65° C. The residual pale yellow gum was cooled in an ice bath and the Grignard complex decomposed by the addition of 200 milliliters of water. The while amorphous solid was collected and washed with water. The damp solid was extracted with three 100 milliliter portions of boiling benzene. The extractions were combined and the solvent removed with warming at reduced pressure. The residual solid (15.8 grams) was dissolved in 60 milliliters of benzene, filtered, and the clear, pale yellow filtrate diluted with 60 milliliters of n-hexane. After chilling at 5° for four hours, the free base was collected as a white crystalline product, washed with benzene-hexane (1:1) and dried at 55°; yield, 12.7 grams (87.5%); melting point 147–148°.

To a warm solution of 5.63 grams (0.02 mole) of the aminoalcohol in 20 milliliters of ethanol was added 8.0 milliliters (0.024 mole) of a 3 N solution of hydrogen chloride in ethanol. Crystallization of the product took place readily. After chilling at 5°, the hydrochloride salt was collected, washed with ethanol and dried at 65°; yield, 5.5 grams (86.5%), melting point 199–200°.

*Example II*

1,1-diphenyl-2-(1-ethyl-3-pyrrolidyl)ethanol hydrochloride.—To 1-ethyl-3-pyrrolidylmethylmagnesium chloride (approximately 0.1 mole) prepared by the same process disclosed in Example I via the addition of 14.75 grams (0.1 mole) of 1-ethyl-3-pyrrolidylmethyl chloride in tetrahydrofuran to 2.43 grams (0.1 mole) of magnesium turnings, was added 9.11 grams (0.05 mole) of benzophenone. The reaction was carried out and the product isolated as described for the synthesis as described in Example I; yield of the free base, based on benzophenone reactant, 14.0 grams (94.8%), melting point 118.0–120.0°.

To 5.9 grams (0.02 mole) of the free base in 10 milligrams of ethanol was added an equivalent of ethanolic hydrogen chloride. The solution was diluted with 60 milliliters of ether and chilled at 0°. The product was collected and recrystallized to a constant melting point from ether-ethanol (4:1); yield 5.7 grams (87.6%), melting point of the hydrochloride 156.0–158.0°.

*Example III*

1,1-diphenyl-2-(1-isopropyl-3-pyrrolidyl)ethanol hydrochloride.—To 1-isopropyl-3-pyrrolidylmethylmagnesium chloride (approximately 0.1 mole) prepared by the method indicated in Example I, via addition of 16.17 grams (0.1 mole) of 1-isopropyl-3-pyrrolidylmethyl chloride in tetrahydrofuran to 2.43 grams (0.1 mole) of magnesium turnings, was added 14.8 grams (0.08 mole) of benzophenone. The reaction was carried out and the product isolated as in Example I.

The crude free base, an oil weighing 17.5 grams (63.3%) was dissolved in 50 milliliters of ether and treated with an equivalent of ethanolic hydrogen chloride. The hydrochloride salt product precipitated as an oil which was crystallized from isopropanol-ethyl acetate to a constant melting point; yield 11.0 grams (56.8%), melting point 173–174°.

*Example IV*

1-cyclohexyl-1-phenyl-2-(1-ethyl-3-pyrrolidyl)ethanol hydrochloride.—A solution of 7.38 grams (0.025 mole) of 1,1-diphenyl-2-(1-ethyl-3-pyrrolidyl)ethanol as prepared in Example II, (free base) in 50 milliliters of glacial acetic acid was treated at 20–25° C. for fifteen minutes with 0.1 gram of Nuchar and filtered. Platinum dioxide (1.0 gram) was added and the mixture shaken (Parr hydrogenator) in an atmosphere of hydrogen until three equivalents of hydrogen had been absorbed. The product was isolated as in Example V but would not crystallize from hexane or petroleum ether. The solvent was removed and the residual oil, weighing 7.4 grams (98.5%), was dissolved in 25 milliliters of ether and an equivalent of ethanolic hydrogen chloride was added. An additional 75 milliliters of ether was introduced and the product allowed to crystallize at 0°. The hydrochloride salt was collected and recrystallized to a constant melting point; yield 3.6 grams, (42.6%), melting point 195.5–196.5°.

*Example V*

1-cyclohexyl-1-phenyl-2-(1-methyl-3-pyrrolidyl)ethanol hydrochloride.—To a solution of 6.5 grams (0.023 mole) of the free base of 1,1-diphenyl-2-(1-methyl-3-pyrrolidyl)-ethanol as prepared in Example I, in 50 milliliters of glacial acetic acid, was added 1.0 gram of platinum dioxide and the mixture shaken in a Parr apparatus under 50 pounds pressure of hydrogen until three equivalents of hydrogen had been absorbed. The catalyst was removed by filtration and the filtrate made basic with 100 milliliters of potassium hydroxide solution (56% aqueous). The oil which separated was extracted with three 50 milliliter portions of benzene. The extractions were combined, washed with water, filtered and the solvent removed with warming on a steam bath at reduced pressure. The brown, residual gum (6.5 grams) was crystallized from hexane. The crystalline product was collected, washed with hexane and dried at 65°; yield, 3.55 grams (53.5%) melting point 100–102°.

To a solution of 3.5 grams (0.012 mole) of the aminoalcohol in 5 milliliters of ethanol and 75 milliliters of ether was added 5.0 milliliters (0.015 mole) of a 3 N solution of hydrogen chloride in ethanol. The product which crystallized after chilling at 5° was collected, washed with ether, and dried at 65°; yield, 3.29 grams (87%) melting point 209–210°. Recrystallization from ethanol-ether gave 3.0 grams (77%), melting point 209–210°.

*Example VI*

1-phenyl-1-(2-tolyl)-2-(1-methyl-3-pyrrolidyl) ethanol hydrochloride.—To 1-methyl-3-pyrrolidylmethyl magnesium chloride prepared as in Example I, via addition of 24.6 grams (0.185 mole) of magnesium turnings, was added 18.0 grams (0.093 mole) of 2-methyl benzophenone. The reaction was carried out and the product isolated as in Example I. The product, a solid, was recrystallized from benzene-hexane to produce a first crop of crystals of constant melting point; yield, 13.0 grams (47.4%), melting point 148–150°. The benzene-hexane mother liquors were set aside for recovery of a second crop of crystals.

To 5.9 grams (0.02 mole) of the aminoalcohol, recovered as a first crop of crystals, was added an equivalent of isopropanolic hydrogen chloride solution. The product, which crystallized with cooling, was collected and recrystallized from isopropanol; yield, 4.2 grams (63.4%), melting point 199.5–200.5°.

The benzene-hexane filtrate from the initial crystallization of the crude aminoalcohol was concentrated and the residual oil dissolved in ether. The product which crystallized on cooling was collected and dried as a second crop of crystals; yield, 5.5 grams (20.0%), melting point 111.5–113.0°.

To 5.5 grams (0.0187 mole) of the aminoalcohol, isolated as above, was added an equivalent of isopropanolic hydrogen chloride. The resulting solution was diluted to cloudiness with ether and chilled at 0°. The crystalline product was collected, washed, and dried at 65°; yield, 4.0 grams (64.5%), melting point 160.0–162.5°.

In this example it will be noted that two products having different melting points are produced. This is accounted for on the basis of the two diasterioisomers which are possible on the basis of the asymmetric carbon atom to which the tolyl group is attached. Isomers have also been observed in the case of the cyclohexyl derivatives as produced in Example V.

While the foregoing examples specifically illustrate the production of the aforesaid 1-phenyl-1-substituted-2-(1-lower alkyl-3-pyrrolidyl)ethanols and the hydrochloride salts thereof, it is readily apparent that other derivatives and acid addition salts of these compositions may be prepared in accordance with other methods well known in the art. For example, in the foregoing the 1-phenyl-1-cyclohexyl derivatives are described as being prepared by the hydrogenation of the 1,1-diphenyl derivatives. However, it will be apparent that these compounds can be prepared directly utilizing the cyclohexyl phenyl ketone as the Grignard reactant.

In this specification where temperatures are indicated they are expressed in degrees centigrade.

While several particular embodiments of this invention are shown above, it will be understood of course that the invention is not to be limited thereto, since many

We claim:
1. A compound selected from the group consisting of 1-phenyl-1-substituted-2-(3-pyrrolidyl)ethanols having the formula

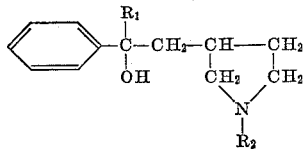

wherein $R_1$ is selected from the group consisting of phenyl, tolyl, and cyclohexyl, and $R_2$ is lower alkyl; and the therapeutically acceptable acid addition salts of said compound.

2. The compound recited in claim 1 wherein $R_1$ is phenyl and $R_2$ is lower alkyl containing up to 6 carbon atoms.

3. 1,1 - diphenyl - 2 - (1 - methyl - 3 - pyrrolidyl)-ethanol hydrochloride.

4. 1,1 - diphenyl - 2 - (1 - ethyl - 3 - pyrrolidyl)-ethanol hydrochloride.

5. 1,1 - diphenyl - 2 - (1 - isopropyl - 3 - pyrrolidyl)-ethanol hydrochloride.

6. 1 - cyclohexyl - 1 - phenyl - 2 - (1 - ethyl - 3 - pyrrolidyl) ethanol.

7. 1 - cyclohexyl - 1 - phenyl - 2 - (1 - methyl - 3 - pyrrolidyl) ethanol.

8. 1 - phenyl - 1 - (2 - tolyl) - 2 - (1 - methyl - 3 - pyrrolidyl) ethanol.

References Cited in the file of this patent

UNITED STATES PATENTS

| | | |
|---|---|---|
| 2,792,399 | Ekenstam et al. | May 14, 1957 |
| 2,799,679 | Ekenstam et al. | July 16, 1957 |
| 2,833,775 | Sperber et al. | May 6, 1958 |
| 2,874,161 | Van Campen et al. | Feb. 17, 1959 |
| 2,894,949 | Tilford et al. | July 14, 1959 |

FOREIGN PATENTS

| | | |
|---|---|---|
| 483,258 | Great Britain | Apr. 14, 1938 |

OTHER REFERENCES

Richter's "Organic Chemistry," vol. 3, pp. 3 to 4 (1923), P. Blakiston's Son and Co.